April 19, 1955 V. F. LINDER 2,706,513
SHEET METAL FORMING DEVICE
Filed Jan. 29, 1951 2 Sheets-Sheet 1

INVENTOR
VICTOR F. LINDER
BY Caswell & Lagaard
ATTORNEYS

April 19, 1955  V. F. LINDER  2,706,513
SHEET METAL FORMING DEVICE
Filed Jan. 29, 1951  2 Sheets-Sheet 2
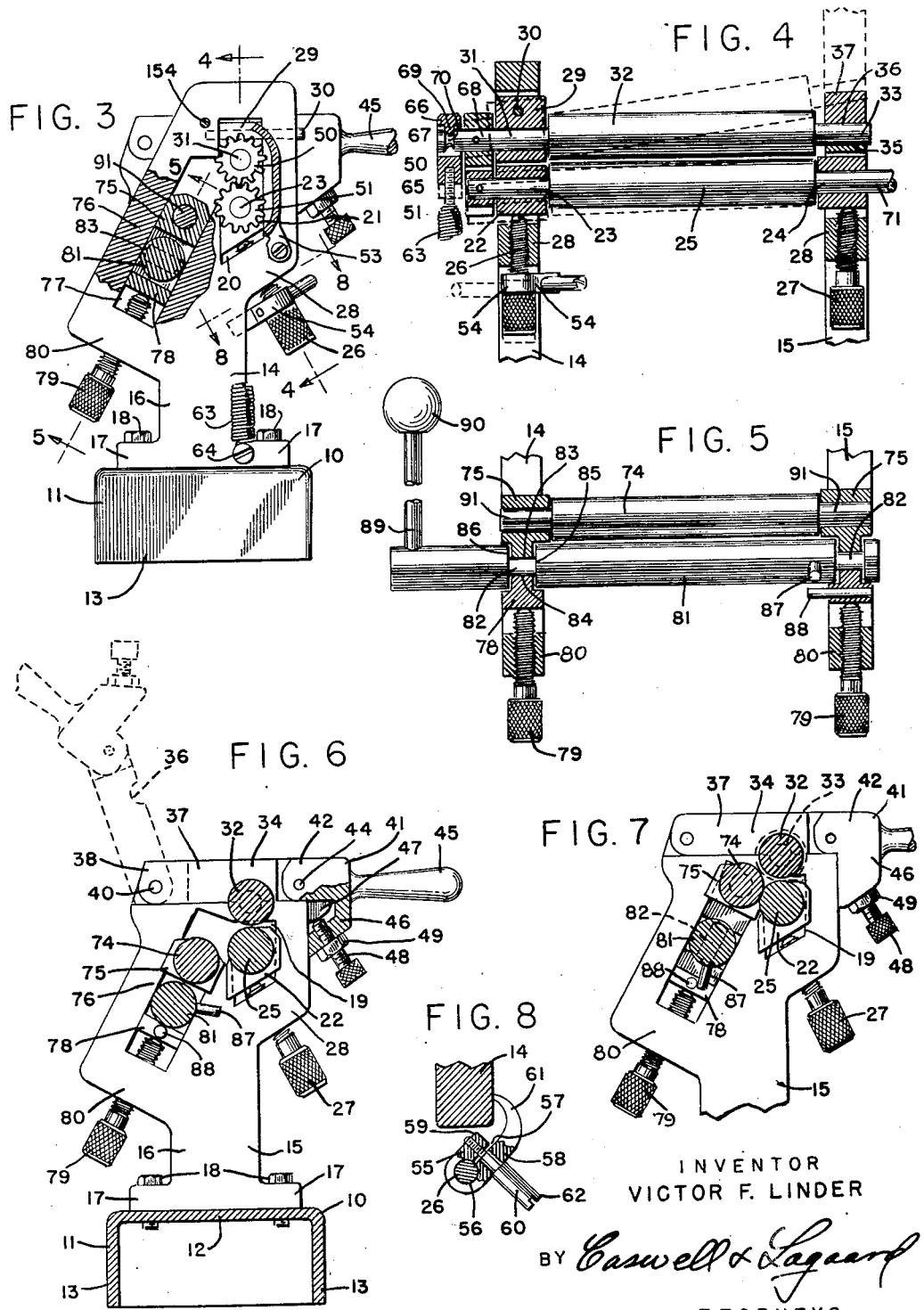
INVENTOR
VICTOR F. LINDER
BY Caswell & Lagaard
ATTORNEYS United States Patent Office 2,706,513
Patented Apr. 19, 1955

2,706,513

SHEET METAL FORMING DEVICE

Victor F. Linder, Lake City, Minn., assignor to O'Neil-Irwin Manufacturing Company, Lake City, Minn., a corporation of Minnesota Application January 29, 1951, Serial No. 208,308

10 Claims. (Cl. 153—54)

The herein disclosed invention relates to sheet metal forming devices and has for an object to provide a device whereby sheet metal may be readily and easily rolled into circular form.

An object of the invention resides in providing a device whereby the sheet metal may be rolled into a complete closed circular tube.

Another object of the invention resides in providing a device by means of which the sheet may be rolled throughout its entire extent.

A still further object of the invention resides in providing a device by means of which the sheet may be formed in the desired form by a single pass through the rolls.

An object of the invention resides in providing a construction utilizing a driving roll, a driven roll and a forming roll and in supporting the driving roll for movement toward and from the driven roll to grip the sheet metal passing therebetween and in further providing a releasable bearing for one end of the driven roll whereby the end of the roll may be freed and the formed sheet may be withdrawn endwise from the driven roll.

Another object of the invention resides in releasing the end of the driving roll opposite the free end of the driven roll to permit of moving the driven roll outwardly a sufficient amount to allow the formed work to clear the support for the rolls.

Another object of the invention resides in providing supports for the rolls and in forming the supports with guides extending toward the driven roll and in further providing bearings for the forming roll slidable along said guides for advancing the forming roll toward the driven roll.

Another object of the invention resides in providing thrust blocks slidable along said guides and disposed outwardly of said bearings and in further providing a cam shaft having cams thereon operable between said thrust blocks and bearings and quickly moving said forming roll toward the driven roll.

A feature of the invention resides in providing adjusting means between the supports and the thrust blocks whereby the operative position of the forming roll may be adjusted.

Other objects of the invention reside in the novel combination and arrangement of parts and in the details of construction hereinafter illustrated and/or described.

In the drawings:

Fig. 3 is an end elevational view of the structure shown in Figs. 1 and 2 with a portion of the structure broken away to illustrate the adjusting device for the forming roll.

Fig. 4 is a longitudinal sectional view taken on line 4—4 of Fig. 3.

Fig. 5 is a fragmentary elevational sectional view taken on line 5—5 of Fig. 3.

Fig. 6 is a cross-sectional view taken on line 6—6 of Fig. 1.

Fig. 7 is a view of a portion of the structure shown in Fig. 6 with the forming roll in operative position.

Fig. 8 is a fragmentary detail sectional view taken on line 8—8 of Fig. 3.

Figure 1:
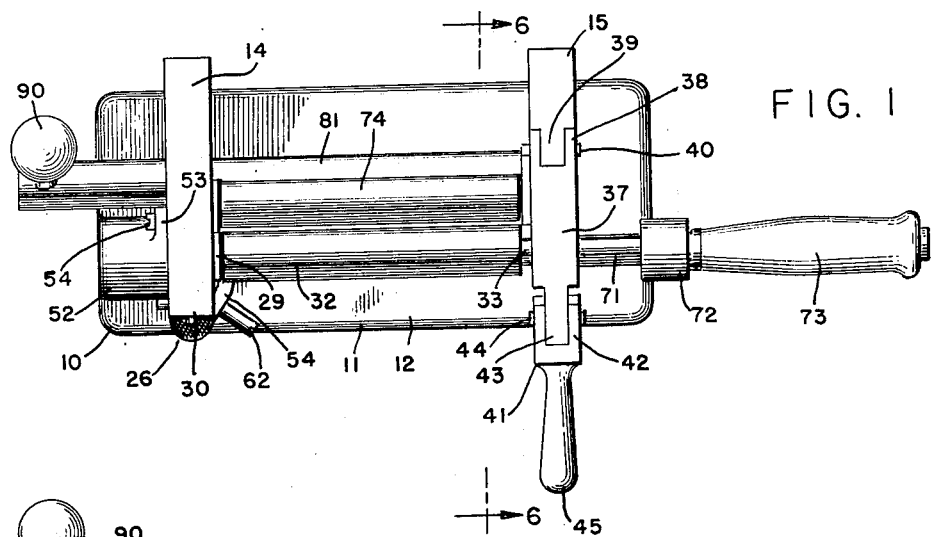
Fig. 1 is a plan view of a sheet metal forming device illustrating an embodiment of the invention.

The device illustrated consists of a base and a frame having two upright supports mounted thereon. Across these supports extend a driving roll, a driven roll and a forming roll. The driving roll is mounted in bearings adapted to be moved toward and from the driven roll by means of adjusting screws. The driven roll is mounted at one end in a bearing pivoted by a transverse pivot to permit of swinging the roll away from the driving roll to release the work formed thereon. The other end of the driven roll is journaled in a split bearing, a portion of which can be temporarily removed to free the end of the roll journaled in said bearing and to permit of withdrawing the work from the roll. A gage on the adjusting screw for the driving roll permits of loosening the bearing for said roll at the end of the same corresponding with the pivoted end of the driven roll whereby greater spread between the rolls can be procured. The supports are provided with guides extending toward the driven roll and in which are slidably mounted bearings for the forming roll. In the same guides are disposed thrust blocks which are also slidably mounted therein. A cam shaft extends through the guides and has cams disposed between the thrust blocks and bearings which serve to move the bearings relative to the thrust blocks and in a direction toward the driven roll. Adjusting screws screwed into the supports adjust the position of the thrust blocks.

The invention comprises a frame indicated in its entirety by the reference numeral 10. This frame consists of a base 11 preferably constructed of sheet metal and which has a top 12 and skirt 13 depending therefrom. Mounted on the base 11 are two supports 14 and 15 which are similarly constructed. These supports have upright portions 16 with flanges 17 projecting outwardly therefrom. Cap screws 18 extend through said flanges and are screwed into the top 12 of base 11 holding the supports rigidly attached thereto.

The supports 14 and 15 are formed with vertically extending slots 19 and 20. In these slots are mounted for vertical sliding movement two bearings 21 and 22. These bearings rotatably support the trunnions 23 and 24 of a roll 25 which is the driving roll of the device and which has been referred to as the first roll. Adjusting screws 26 and 27 are screwed into portions 28 of the supports 14 and 15 and engage the lowermost ends of the bearings 21 and 22 and serve to raise the roll 25. In the upper end of the slot 20 is a bearing 29 which is pivoted for swinging movement about a transverse axis by means of a pin 30. In the bearing 29 is rotatably supported the trunnion 31 of a roll 32 which is the driven roll of the device and which has been referred to as the second roll. The other end of said roll is formed with a trunnion 33 which is journaled in a split bearing indicated in its entirety by the reference numeral 34. This bearing consists of a semicircular socket 35 formed on the uppermost portion of the support 15 and immediately above the end of the slot 19. The bearing 34 is further formed by a semicircular socket 36 formed in a swinging arm 37. This arm has a fork 38 at the end of the same which straddles an ear 39 on the support 15. A pin 40 extends through said fork and ear and supports the arm 37 for swinging movement from the position shown in full lines in Fig. 6 to that shown in dotted lines in said figure. The arm 37 may be retained in the position shown in full lines in Fig. 6 by means of a clamp 41. Clamp 41 has a fork 42 which straddles an ear 43 on the end of the arm 37. A pin 44 extends through said fork and ear and supports the clamp 41 for swinging movement relative to arm 37. The said clamp is manipulated by means of a handle 45 issuing outwardly therefrom. The clamp 41 has a projection 46 which is adapted to underlie a lug 47 issuing outwardly from the support 15. A screw 48 screwed into the projection 46 engages the lug and a lock nut 49 holds the screw in adjusted position. When the handle is swung downwardly the end of the screw 48 engages the lug 47 and rides along the surface of the same until it reaches the position shown in full lines in Fig. 6. This clamps the arm 37 in position and retains the trunnion 33 within the bearing 34. Upon release of the arm 37 to the position shown in dotted lines in Fig. 6 the roll 32 may be swung upwardly as shown in dotted lines in Fig. 4 to release the work formed thereon.

The roll 32 is driven from the roll 25 in the following manner: Attached to the trunnions 23 and 31 of the rolls 25 and 32 are two spur gears 50 and 51. These gears are pinned or otherwise secured to said trunnions and preferably have long teeth to permit of some relative adjustment of the rolls 25 and 32 relative to one another with the teeth remaining in mesh. A case 52 encloses the said gears and is formed with lugs 53 extending outwardly therefrom and overlying the outer surface of the support 14. Screws 54 extend through these lugs and are screwed into the support 14.

Additional movement of the roll 32 away from the roll 25 is procured by unloosening the screw 26 which frees the bearing 22 and permits the trunnion 23 to move downwardly as shown in dotted lines in Fig. 4. In order to bring the screw 26 back to normal position a gage 54 is employed which is best shown in detail in Fig. 8. This gage comprises a body 55 which is formed with a bore 56 adapted to be mounted on the unthreaded portion of the shank of the screw 26. The said body is formeed with a slit 57 which divides the body into two parts 58 and 59. A thumb screw 60 passes through the part 58 and is screwed into the part 59 and serves to clamp the part 55 on the screw 56. The part 58 has formed on it a finger 61 which engages the inner surface of the support 14 and limits movement of the screw 26 tending to move the roll 25 toward the roll 32. The screw 60 is formed with a head 62 of appreciable length and which serves as a fingerpiece for manipulating said screw.

The roll 32 is urged into the position shown in dotted lines in Fig. 4 by means of tension coil spring 63. This coil spring is hooked at one end on a screw 64 attached to the support 14 and its other end is screwed on a threaded shank 65 which in turn is screwed into an eye 66. The eye 66 has a hole 67 in the same which receives the protruding end 68 of the trunnion 31 of roll 32. A bead 69 formed on the eye 66 at the upper surface of the hole 67 engages a groove 70 in said end 68 and retains the eye in position. This construction permits of turning the roll 32 and at the same time pulls downwardly on the roll so that when the bearing 34 is opened the spring 63 immediately moves roll 32 into the position shown in dotted lines in Fig. 4. The trunnion 24 of roll 25 has an extension 71 and to which is attached a crank 72 having a handle 73. By adjusting the screws 26 and 27 the desired pressure of the rolls 25 and 32 on the sheet being formed can be procured and rotation of the crank 72 causes the sheet to be advanced between said rolls and toward the forming roll of the invention.

The forming roll of the invention is designated by the reference numeral 74 and is situated rearwardly of rolls 25 and 32 which are disposed at the forward part of the device. Roll 74 is journaled in two bearings 75 which are slidably mounted in guides 76 formed by means of slots 77 in the supports 14 and 15. The slots 77 extend for an appreciable length of said supports and are directed toward the driven or second roll 32. By means of this construction the roll 74 may be moved toward and from the roll 32. Also slidably mounted in the guides 76 are two thrust blocks 78 which are situated outwardly of the bearings 75 and which are spaced therefrom. These thrust blocks butt up against two adjusting screws 79 which are screwed into portions 80 of the supports 14 and 15 at the ends of the slots 77. These screws determine the position of roll 74 with reference to the roll 32 when said roll is in operative position.

Disposed in the groove 77 and between the thrust blocks 78 and bearings 75 is a cam shaft 81. This cam shaft has portions of the same cut away at the locality of said blocks and bearings to form two cams 82. These cams are adapted to engage the under sides 83 of the bearings 75 and the upper sides 84 of the thrust blocks 78. The cams 82, as best shown in Fig. 3, are relatively flat so that when the shaft 81 is rotated the bearings 75 are moved away from the thrust blocks 78. The cams 82 are slightly smaller than the diameter of the shaft 81 so that shoulders 85 and 86 are formed which butt up against portions of the said blocks and bearings and restrain endwise movement of the shaft 81 with reference to the frame 10. Rotation of the shaft 81 is limited by means of a pin 87 extending outwardly from said shaft and which engages a stop 88 issuing outwardly from one of the thrust blocks 78. Movement of the cam shaft 81 is procured by means of a handle 89 extending outwardly therefrom and provided at its end with a knob 90.

Figure 2:
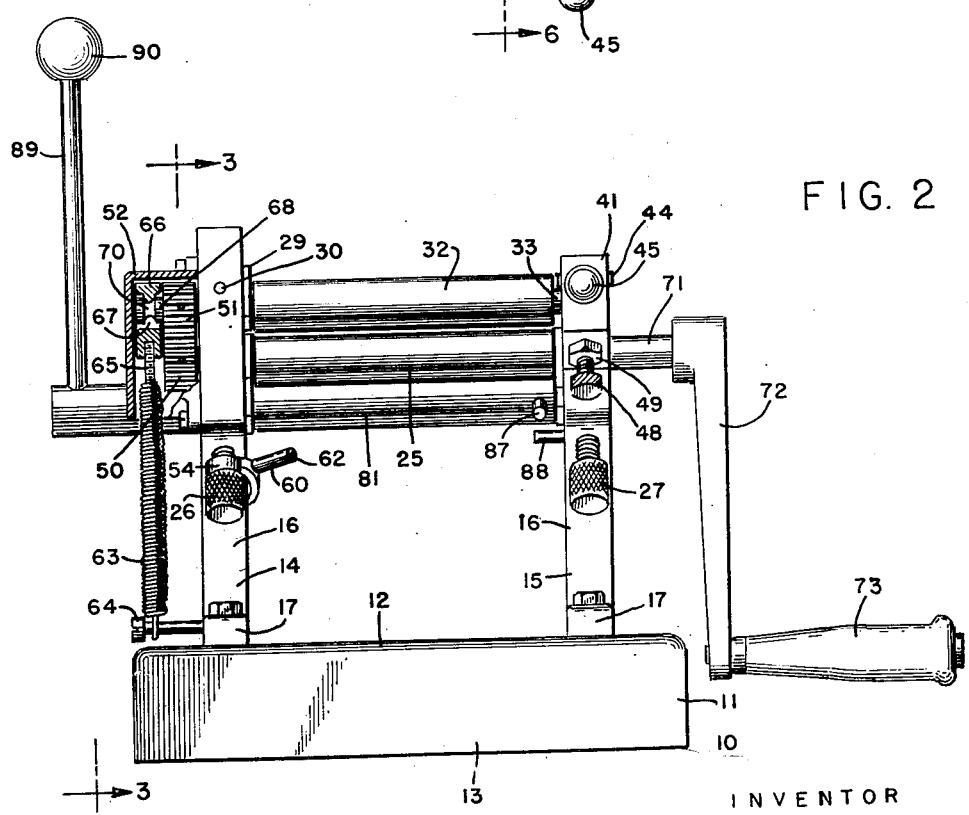
Fig. 2 is a front elevational view of the structure shown in Fig. 1 with a portion of the same broken away to illustrate the driving mechanism of the rolls of the forming device.

The use of the invention is as follows: The roll 32 is first positioned as shown in Fig. 2 and the handle 45 moved downwardly to bring the screw 48 into engagement with the lug 47. This clamps the roll 32 in position and closes the bearing 34. Screws 26 and 27 are next adjusted until the roll 25 is brought up sufficiently close to the roll 32 to frictionally engage the sheet being fed to the device and to advance the same when roll 25 is rotated. The screws 79 are next adjusted until the roll 74 is at the proper position with reference to the roll 32 to form the desired curvature in the sheet. Handle 89 is next manipulated to rotate cam shaft 81 and move the cams 82 into the position shown in Fig. 7. The handle 73 is then turned and roll 25 rotated. This simultaneously rotates roll 32 through the gears 50 and 51 and the work is fed through the device. Upon engaging the forming roll 74 the work is coiled about the roll 32 as indicated in dotted lines in Fig. 7. Upon completion of the work handle 45 is swung upwardly and the arm 37 moved to the position shown in dotted lines in Fig. 6. Spring 63 now draws the roll 32 upwardly as shown in dotted lines in Fig. 4. Upon movement of the finger piece 62 toward the position shown in dotted lines in Fig. 4 the screw 26 is partly unscrewed and the pressure on the bearing 22 released to permit of swinging the roll 32 upwardly to a greater extent than would be the case if the bearing 22 were held in its normal position. This brings the roll 32 above the support 15 and permits of withdrawing the formed work from the roll by endwise movement of the work. By adjusting the screws 79 any degree of curvature can be procured. The formed work is made with a single pass through the device. Where a tube is desired, fitting closely about the roll 32 the sheet may be projected partly beyond the rolls 32 and 25 and the roll 74 subsequently moved into position by means of cam shaft 81. The said roll moving into position forms the initial bend on the projecting end of the sheet and thereafter serves to roll the sheet into the form of a tube as the sheet passes through the rolls.

The advantages of the invention are manifest. The device is extremely simple in construction and may be built at an economical cost. With the invention tubes of extremely small diameter may be formed with the device and by a single pass through the same. Tubes formed on the driven roll may be made relatively small and completely closed if desired and may easily and quickly be removed from the device.

Changes in the specific form of the invention, as herein described, may be made within the scope of what is claimed without departing from the spirit of the invention.

Having described the invention, what is claimed as new and desired to be protected by Letters Patent is:

1. In a sheet metal forming device, a frame including spaced first and second supports, a first roll, a second roll and a forming roll extending across said supports, bearings for said first and second rolls carried by said supports, said first and second rolls receiving the sheet of metal therebetween and upon rotation of one of said rolls advancing the sheet, bearings for said forming roll, guides in said supports extending in a direction toward said second roll, said last named bearings being guided for sliding movement in said guides, a cam shaft extending across said supports, cams on said cam shaft engaging said bearings and upon rotation of said cam shaft in a certain direction moving said bearings toward said second roll, thrust blocks carried by said supports and slidable along said guides and engaged by said cams and adjusting screws screwed into said supports and engaging said thrust blocks for determining the operative positions of said forming roll with reference to said second roll.

2. In a sheet metal forming device, a frame including spaced first and second supports, a first roll, a second roll and a forming roll extending across said supports, bearings for said first and second rolls carried by said supports, said first and second rolls receiving the sheet of metal therebetween and upon rotation of one of said rolls advancing the sheet, bearings for said forming roll, guides in said supports extending in a direction toward said second roll, said last named bearings being guided for sliding movement in said guides, a cam shaft extending across said supports, cams on said cam shaft engaging said bearings and upon rotation of said cam shaft in a certain direction moving said bearings toward said second roll, thrust blocks carried by said supports and slidable along said guideways and engaged by said cams and an adjusting device operating between said thrust blocks and said supports for determining the operating position of said forming roll with reference to said second roll.

3. In a sheet metal forming device a frame including spaced first and second supports, a first roll, a second roll and a forming roll extending across said supports, bearings for said first and second rolls carried by said supports, said first and second rolls receiving the sheet of metal therebetween and upon rotation of one of said rolls advancing the sheet, bearing for said forming roll, guides in said supports extending in a direction toward said second roll, said last named bearings being guided for sliding movement in said guides, thrust blocks guided for sliding movement along said guides and disposed adjacent said bearings and on the side thereof furthest from said second roll, a cam shaft extending across said supports, cams on said cam shaft, each of said cams engaging on one side one of said bearings and on the other side one of said thrust blocks and serving upon rotation of the cam shaft in one direction to move the bearings away from the thrust blocks and said forming roll toward said second roll, and adjustable limiting means for limiting the movement of said thrust blocks away from said second roll.

4. In a sheet metal forming device, a frame including spaced first and second supports, a first roll, a second roll and a forming roll extending across said supports, bearing for said first and second rolls carried by said supports, said first and second rolls receiving the sheet of metal therebetween and upon rotation of one of said rolls advancing the sheet, bearings for said forming roll, guides in said supports extending in a direction toward said second roll, said bearings being guided for sliding movement in said guides, thrust blocks guided for sliding movement along said guides and disposed adjacent said bearings and on the side thereof furthest from said second roll, a cam shaft extending across said supports, cams on said cam shaft, each of said cams engaging on one side one of said bearings and on the other side one of said thrust blocks and serving upon rotation of the cam shaft in one direction to move the bearings away from the thrust blocks and said forming roll toward said second roll and screws screwed into said supports and engaging said thrust blocks for limiting the movement of said thrust blocks away from said second roll.

5. In a sheet metal forming device, a frame including spaced first and second supports, a first roll, a second roll and a forming roll extending across said supports, bearings for said first and second rolls carried by said supports, said first and second rolls receiving the sheet of metal therebetween and upon rotation of one of said rolls advancing the sheet, bearings for said forming roll, spaced elongated guides in said supports extending in a direction toward said second roll, said supports having portions at the outer ends of said guides, said last named bearings being guided for sliding movement by said guides, a cam shaft extending across said supports outwardly of said bearings, cams on said cam shaft engaging said bearings and upon rotation of said cam shaft in a certain direction moving said bearings toward said second roll, thrust blocks carried by said supports and slidable along said guides and engaged by said cams, said thrust blocks being disposed between said guides and between said shaft and the denoted portions of said supports and adjusting screws screwed into said portions of said supports and engaging said thrust blocks for determining the operative positions of said forming roll with reference to said second roll.

6. In a sheet metal forming device, a frame including spaced first and second supports, a first roll, a second roll and a forming roll extending across said supports, bearings for said first and second rolls carried by said supports, said first and second rolls receiving the sheet of metal therebetween and upon rotation of one of said rolls advancing the sheet, bearings for said forming roll, spaced elongated guides in said supports extending in a direction toward said second roll, said supports having portions at the outer ends of said guides, said last named bearings being guided for sliding movement by said guides, a cam shaft extending between said guides outwardly of said bearings and slidable along and rotatable relative to said guides, thrust blocks slidably supported by said guides and disposed outwardly of said cam shaft, cams on said cam shaft engageable with said bearings and with said thrust blocks and upon rotational movement urging said bearings away from said thrust blocks and the forming roll toward the second roll and adjusting screws screwed into said portions of said supports and engaging said thrust blocks for determining the operative positions of said forming roll with reference to said second roll.

7. In a sheet metal forming device, a frame including spaced first and second supports, a first roll, a second roll and a forming roll extending across said supports, bearings for said first and second rolls carried by said supports, said first and second rolls receiving the sheet of metal therebetween and upon rotation of one of said rolls advancing the sheet, bearings for said forming roll, spaced elongated guides in said supports extending in a direction toward said second roll, said supports having portions at the outer ends of said guides, said last named bearings being guided for sliding movement by said guides, a cam shaft extending between said guides outwardly of said bearings and slidable along and rotatable relative to said guides, thrust blocks slidably supported by said guides and disposed outwardly of said cam shaft, cams on said cam shaft each having spaced surfaces, the diametral distance between which, with reference to the cam shaft, is of lesser extent than the diametral distance between two other surfaces of said cam shaft spaced circumferentially from the first named surfaces, certain of said surfaces being engageable with said bearings and others with said thrust blocks to move said bearings away from said thrust blocks and said forming roll toward said second roll and adjusting screws screwed into said portions of said supports and engaging said thrust blocks for determining the operative positions of said forming roll with reference to said second roll.

8. In a sheet metal forming device, a frame including spaced first and second supports, a first roll, a second roll and a forming roll extending across said supports, bearings for said first and second rolls carried by said supports, said first and second rolls receiving the sheet of metal therebetween and upon rotation of one of said rolls advancing the sheet, bearings for said forming roll, spaced elongated guides in said supports extending in a direction toward said second roll, said supports having portions at the outer ends of said guides, said last named bearings being guided for sliding movement by said guides, a cam shaft extending between said guides outwardly of said bearings and slidable along and rotatable relative to said guides, thrust blocks slidably supported by said guides and disposed outwardly of said cam shaft, cams on said cam shaft ovular-shape in cross section engageable with said bearings and with said thrust blocks and upon rotational movement urging said bearings away from said thrust blocks and the forming roll toward the second roll and adjusting screws screwed into said portions of said supports and engaging said thrust blocks for determining the operative positions of said forming roll with reference to said second roll.

9. In a sheet metal forming device, a frame including spaced first and second supports, a first roll, a second roll and a forming roll extending across said supports, bearings for said first and second rolls carried by said supports, said first and second rolls receiving the sheet of metal therebetween and upon rotation of one of said rolls advancing the sheet, bearings for said forming roll, spaced elongated guides in said supports extending in a direction toward said second roll, said supports having portions at the outer ends of said guides, said last named bearings being guided for sliding movement by said guides, a cam shaft extending between said guides outwardly of said bearings and slidable along and rotatable relative to said guides, thrust blocks slidably supported by said guides and disposed outwardly of said cam shaft, cams on said cam shaft engageable with said bearings and with said thrust blocks and upon rotational movement urging said bearings away from said thrust blocks and the forming roll toward the second roll, a stop on one of said thrust blocks, a stop on said cam shaft and engageable with said stop on the thrust block to terminate movement of the cam shaft when the forming roll has been urged into proximity to the second roll and adjusting screws screwed into said portions of said supports and engaging said thrust blocks for determining the operative positions of said forming roll with reference to said second roll.

10. In a sheet metal forming device, a frame including spaced first and second supports, a first roll, a second roll and a forming roll extending across said supports, a bearing for one end of said second roll, pivot means between said first support and said bearing and having its axis extending at right angles to a plane containing the axes of said first and second rolls and guiding the other end of said second roll for movement toward and from said first roll, a split bearing for the other end of said second roll having a portion formed in a part carried by the second support, a releasable clamp member mounted on said second support, said split bearing having a portion formed in said clamp member, bearings for said first roll mounted in said supports, spaced guides in said supports receiving said bearings therebetween and guiding said bearings for movement to procure movement of said first roll toward and from said second roll, said supports having portions at the outer ends of said guides, screws screwed in said portions and engaging said bearings to adjust the position of said first roll relative to said second roll, a gage rotatably mounted on the screw on said support having the pivoted bearing, a fixed stop on said last named support, a stop on said gage engagable with said fixed stop, clamp means for locking said gage relative to said screw, bearings for said forming roll and guide means in said supports for guiding said last named bearings for movement toward and from the bearings of said second roll.

References Cited in the file of this patent

UNITED STATES PATENTS

| | | |
|---|---|---|
| 484,368 | Horner | Oct. 11, 1892 |
| 965,171 | Erickson | July 26, 1910 |
| 1,375,038 | D'Orville | Apr. 19, 1921 |
| 1,406,004 | Hahnemann | Feb. 7, 1922 |
| 1,511,547 | Wasson | Oct. 14, 1924 |
| 1,973,164 | Dreis | Sept. 11, 1934 |